April 18, 1933. F. H. LYNDS 1,904,872
MOVING PICTURE SCREEN
Filed March 19, 1930 2 Sheets-Sheet 1
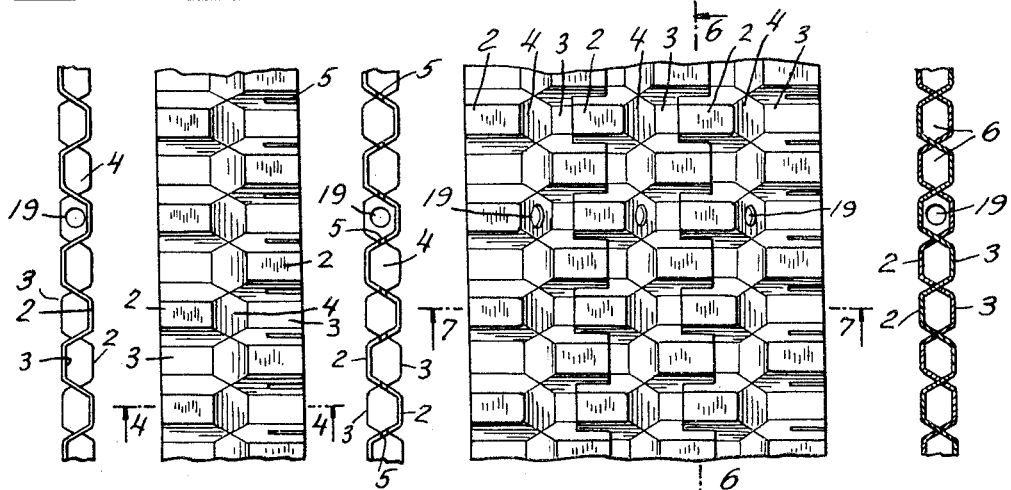
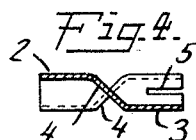
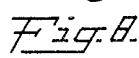
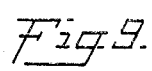
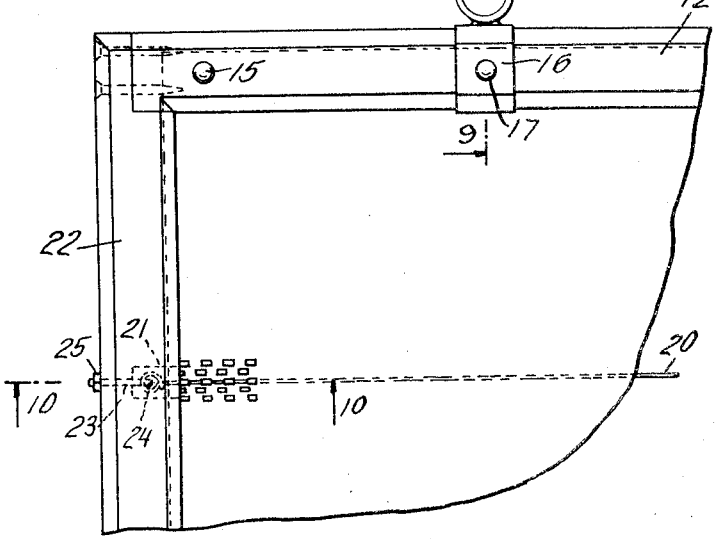
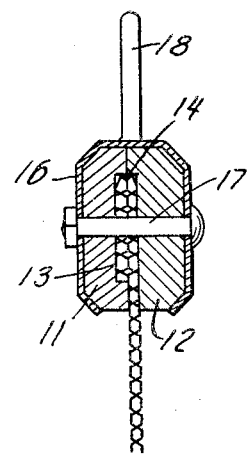
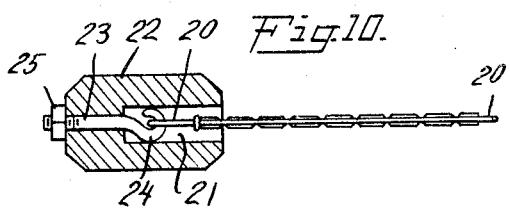
INVENTOR
Fred H. Lynds
BY
Pennie, Davis, Marvin & Edmonds
ATTORNEYS April 18, 1933.  F. H. LYNDS  1,904,872
MOVING PICTURE SCREEN
Filed March 19, 1930   2 Sheets-Sheet 2
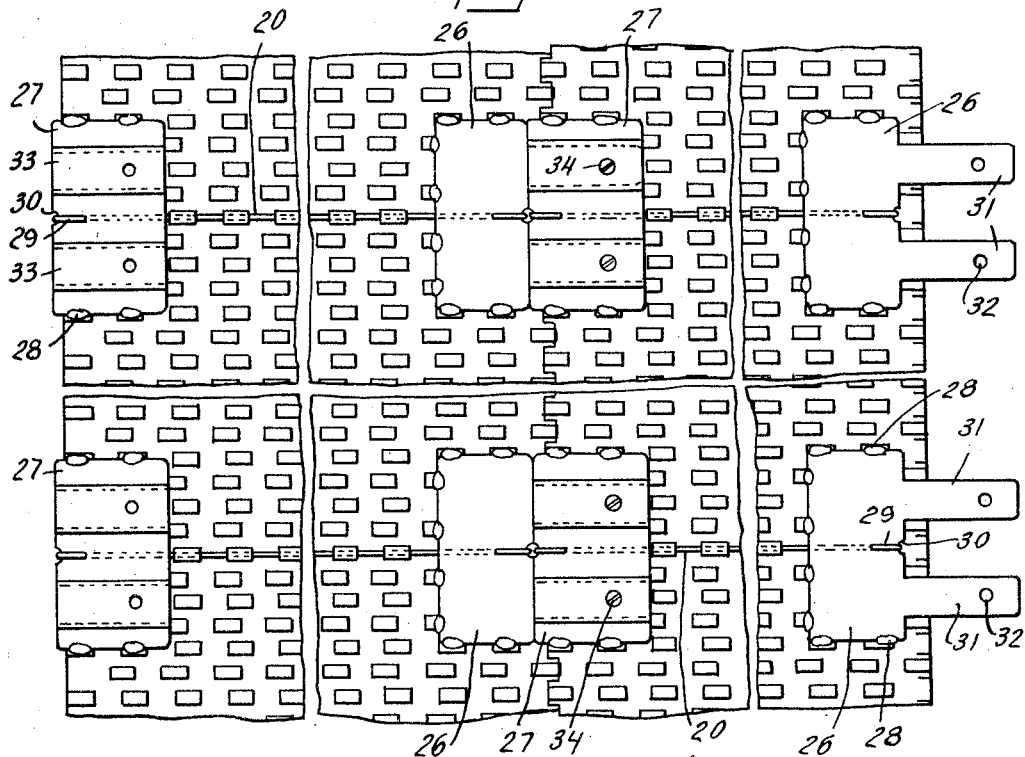
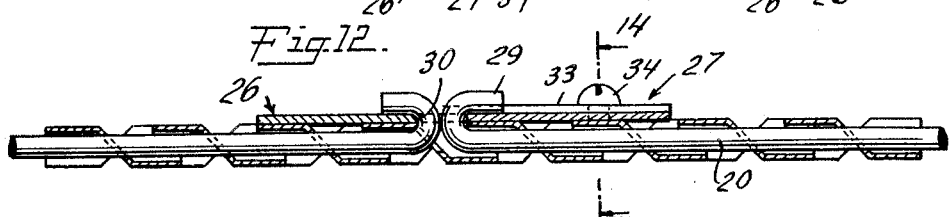
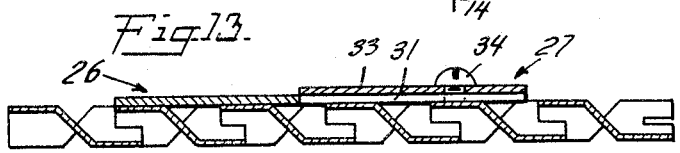
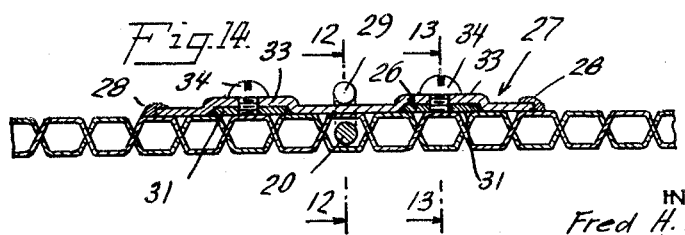
INVENTOR
Fred H. Lynds
BY
Pennie, Davis, Marvin & Edmonds
ATTORNEYS Patented Apr. 18, 1933

1,904,872

UNITED STATES PATENT OFFICE

FRED HARRIS LYNDS, OF NORTH ATTLEBORO, MASSACHUSETTS

MOVING PICTURE SCREEN

Application filed March 19, 1930. Serial No. 437,061.

This invention relates to moving picture screens and more particularly to a screen adapted for use in the presentation of sound pictures, and being provided with means for transmitting sounds through the screen from a loud speaker arranged in back of the screen without interfering with the display of the picture.

With the introduction of sound pictures, the moving picture industry was faced with many new problems. It is not only necessary to synchronize the sound and picture reproduction, but the sound must issue from a place that will create the impression that the figures on the screen are actually producing it. The moving picture industry has decided that this effect is best obtained by placing the loud speakers or sound reproducers in back of the screen and it is the universal practice at the present time to employ one or more loud speakers in back of the screen for sound reproduction.

With the loud speakers arranged in back of the screen it is then necessary to get the sound through the screen to the audience. For this purpose the screens now employed are provided with a plurality of small perforations. These perforations are so small that they can not be seen at a slight distance from the screen and in practical use can not be seen from the front of the seating portion of the theatre. Even though such perforations can not actually be seen, they lower the effectiveness of the screen as a reflector and therefore lower the efficiency of the picture reproduction. Furthermore, they are very inefficient as sound transmitters and only a small percentage of sounds of some frequencies pass through the screen.

In the present invention I provide a screen having a continuous surface at an angle normal to the plane of the screen and at angles approaching the normal so that a substantially solid reflecting surface is provided for the projection of pictures. The screen is further provided with a plurality of openings so that the sound can freely pass through it but these openings are formed at a relatively sharp angle to the surface and do not interfere with the sound reproduction. The axes of the openings are substantially parallel to the surface of the screen and the angle of a ray of light passing through one of the openings is much less than the angle at which the rays of light from the projecting machine strike the screen surface, and is also much less than the angle from an observer's eye to the screen, regardless of where the observer is seated in a theatre. The effect of a solid screen is thus produced as all of the light from the projecting machine is reflected when it strikes the surface of the screen and at no position in the theatre can an observer see through the openings in the screen.

I preferably produce such a screen by means of a plurality of metal strips having alternating raised and depressed portions and interlock a number of these strips with the raised portions of one strip overlapping the depressed portion of the adjacent strips to produce a screen of the desired size. Where the edges of adjacent strips overlap, a passage is provided for the transmission of sound. The axes of these passages are substantially parallel to the face of the screen with one of the openings in front of the screen and the other end in back of the screen. Due to the overlapping of the adjacent edges, a solid reflecting surface is provided and the passages are of such length that it is only possible for light to pass through them at a very acute angle.

In the accompanying drawings I have shown one form of the invention. In the drawings, Fig. 1 is a front elevation of a portion of one of the strips;

Fig. 2 is an end elevation of the left side;

Fig. 3 is a similar view of the right side;

Fig. 4 is a transverse, sectional view on line 4—4 of Fig. 1;

Fig. 5 is an enlarged, front elevation showing a plurality of the strips secured to each other;

Fig. 6 is a detailed, sectional view on line 6—6 of Fig. 5;

Fig. 7 is a transverse, sectional view on line 7—7 of Fig. 5;

Fig. 8 is a front elevation of one corner of an assembled screen illustrating one method of supporting the screen in a frame;

Fig. 9 is a detailed, sectional view on line 9—9 of Fig. 8;

Fig. 10 is a similar view on line 10—10 of Fig. 8;

Fig. 11 is a rear elevation of a portion of a screen, illustrating one method of securing a number of sections to each other;

Fig. 12 is a detail sectional view on an enlarged scale, on line 12—12 of Fig. 14;

Fig. 13 is a similar view on line 13—13 of Fig. 14, and

Fig. 14 is a similar view on line 14—14 of Fig. 12.

Referring to Figs. 1 to 4 of the drawings, the screen is preferably formed of a plurality of strips 1 of suitable metal such as zinc or aluminum and is first passed through a suitable die to form two rows of adjacent raised portions 2 and depressed portions 3. In end elevation each half of the strip resembles a corrugated board as shown in Figs. 2 and 3 of the drawings. At the back of each raised portion the metal is inclined as indicated at 4 in Fig. 4 of the drawings and this inclined portion extends more than half the width of the strip from the edge so that these inclined surfaces overlap as shown in Fig. 4 and extend into the aligned depressed portion 3 at the other edge of the strip. After the strip has been formed as heretofore described, it is sawed or otherwise cut as indicated at 5 to form a plurality of slots extending from one edge a distance less than half the thickness of the strip. The row of slots 5 in each strip are in the same plane as shown in Fig. 3 of the drawings which permits a plurality of the slots to be cut into a strip of a desired length in a single operation. A plurality of the strips shown in Fig. 1 of the drawings are then assembled as shown in Figs. 5, 6 and 7 of the drawings. In assembling the strips the uncut edge of one strip, shown in Fig. 2 of the drawings, is brought into contact with the cut edge of the adjacent strip and the strips are brought together as shown in Figs. 5 to 7 of the drawings with the depressions 3 on the edge of one strip in alignment with the raised portions 2 of the adjacent strip. As shown in Fig. 7 of the drawings, this provides a screen having a plurality of passages 6, the axes of which are substantially parallel to the surface of the screen. The edge 7 of one strip overlaps the edge 8 of the adjacent strip and this provides an opening 9 into the passage 6 from one side of the screen and an opening 10 into the passage 6 from the other side of the screen. It will be apparent that when a screen is built up in the manner described, a plurality of these passages and openings is provided and the total area of the openings through the screen is far greater than that of the total area of a plurality of small perforations such as is used at the present time so that the sound can much more readily pass through the screen from one surface to the other. At the same time, the overlapping of the edges 7 and 8 produces a construction in which a ray of light passing through the screen would be at a relatively sharp angle to the surface of the screen. In actual practice the angle of such ray of light to the surface of the screen is much more acute than the angle at which the rays of light from the projecting machine strike the surface of the screen so that a substantially solid reflecting surface is provided. Furthermore, the angle at which a ray of light must pass through the screen is much greater than the angle from the eye of the observer located anywhere in the theater to the screen so that to a person in the audience it appears solid and the openings therein are invisible.

The screen may be assembled in a frame in any suitable manner. In Figs. 8 to 10 of the drawings I have illustrated one method of assembling a screen of this character. In Fig. 8 I have illustrated one corner of the screen, but the upper and lower frame members are alike and the two side members are alike so further illustration is unnecessary. As shown the upper frame member consists of two bars 11 and 12 which may be formed of wood or any other suitable material, one of which is provided with a recess 13. The edge of the screen may be bent over as indicated at 14 and received in this recess. Suitable clamping bolts 15 may be passed through the frame member at necessary intervals and the screen may be supported by the use of bracket members 16 which embrace the bars 11 and 13 and are secured thereto by bolts 17. The bracket members may be provided with eyes 18 for the reception of guy ropes which may be fastened to the floor at the bottom of the screen to a suitable overhead support at the top of the screen.

At suitable intervals throughout the screen the inclined walls 4 of the raised portions may be provided with openings 19 and these openings are adapted to be arranged in alignment as shown in Fig. 5 of the drawings. A rod 20 (see Fig. 8) is adapted to be passed through these openings to add to the rigidity of the screen and this rod may be provided with an eye 20' on its end which is adapted to be received in a recess 21 in a side frame member 22. A bolt 23 having a hook 24 on one end is adapted to be arranged in the side frame member with the hook arranged in the eye 21 and the screen is tightened transversely of the frame by a nut 25 arranged on the projecting end of this bolt. The frame structure heretofore described is one of the many ways of supporting the screen in its operative position and the invention is in no sense limited to this feature. Similarly, the provision of the corrugations or alternate raised and depressed portions in a pair of rows on each section or strip of the screen is not essential as a strip could be used in which one row of depressions and raised portions are arranged on each strip or a strip could be used in which more than two rows of this character are arranged on each strip. Furthermore, I do not consider my invention as limited to a screen built up of a plurality of individual strips as the same effect may be obtained by suitable formation of sheet metal or other similar material to form a screen having a plurality of passages with their axes substantially parallel to the surface of the screen and having openings at each end communicating with the opposite sides of the screen. In its broadest aspects my invention comprises any means for accomplishing this result in which the edges of the openings overlap so that a ray of light passing through the screen is at such an acute angle to the screen that a solid picture projecting surface is provided and also a substantially solid construction is seen by the observer from any position in the theatre. The passages may extend transversely of the screen as shown in Fig. 8 of the drawings or may extend vertically of the screen by running the strips at right angles to the manner in which they are shown in this figure.

In Figs. 11 to 14 of the drawings I have disclosed additional means for assembling a plurality of the strips 1 to produce a screen of a desired size. As shown, a number of the strips are first assembled to form sections, two of which are shown in Fig. 11. Complementary connecting members are arranged at suitable intervals along two parallel edges of the screen, and these connecting members are adapted to cooperate with similar members on the edges of adjacent sections. The connecting members consist of male members 26 and female members 27 which are arranged on the back of the screen, preferably in alignment with the rods 20. They may be secured to the screen in any suitable manner, as by soldering as indicated at 28.

Instead of having rods 20 of a length to extend the entire height or width of the screen, as shown in Fig. 8, they may be of a length slightly greater than the width of one section of the screen and the ends of the rods may be bent over the connector 26 or 27, as at 29. The edge of the connector may be provided with a groove or recess, as at 30, which receives the rod and holds it in place.

The male connecting member comprises a substantially flat plate having a pair of tongues 31 which project beyond the edge of the screen section. These tongues may be provided with threaded openings 32. The female members are provided with grooves 33 on their inner faces (see Fig. 14) and these grooves are adapted to receive the tongues 31. The walls of the grooves are provided with openings which align with the openings 32 when the sections are assembled, and bolts 34 or other suitable fastening elements are arranged in these openings. The sections of the screen are thus rigidly and securely fastened to each other.

The surface of the screen may be painted any desired color that will permit proper reproduction of the pictures and the screen may be built of any desired size by employing a sufficient number of the strips to obtain the desired height and width of the screen and employing strips of sufficient length to obtain the other desired dimension.

Another important feature of the invention is that the screen may be rolled to facilitate transportation and a screen of the usual size for the average theatre can be rolled in about a two foot diameter without crushing or otherwise injuring the surface. In rolling the screen the rods 20 are arranged parallel to the axis of the roll.

I claim:

1. A moving picture screen having a substantially continuous corrugated reflecting surface, and having portions thereof of two thicknesses with the depressions and raised portions of said corrugations overlapping to form passages through the screen.

2. A moving picture screen comprising a plurality of sections of material each of said sections having alternating raised and depressed portions, the raised portions of one section overlapping the depressed portions of the adjacent section to form passages through the screen.

3. A moving picture screen comprising a plurality of corrugated strips, the adjacent edges of said strips being overlapped with the raised portions of one aligned with the depressed portions of the other to form passages through the screen.

4. A moving picture screen comprising a plurality of corrugated strips, one edge of each strip being provided with slots in a plane substantially parallel to the plane of the screen, the edge of the adjacent strip being adapted to be received in said slots with the raised portions of one strip in alignment with the depressed portions of the adjacent strip to form passages through the screen.

5. A moving picture screen comprising a plurality of corrugated strips, the adjacent edges of said strips being overlapped with the raised portions of one strip in alignment with the depressed portions of the other strip to form a plurality of passages through the screen, said passages being arranged in rows, and rods extending through spaced rows of passages to reinforce said screen.

6. A moving picture screen comprising a plurality of sections, each section being formed of strips of material having alternating raised and depressed portions, the raised portions of one strip overlapping the depressed portions of an adjacent strip to form passages through the screen, and means for securing a plurality of said sections to each other.

7. A moving picture screen comprising a plurality of strips of material, the edges of said strips of material being corrugated and overlapped, the overlapped portions of said strips being spaced from each other to form passages through the screen having axes substantially parallel to the surface of the screen.

8. A moving picture screen comprising a plurality of strips of material, the edges of said strips being corrugated, one edge of each strip being provided with slots substantially in the plane of the screen, the corrugated edge of the adjacent strip being adapted to be received in said slots whereby said edges are overlapped and the overlapped edges spaced from each other to form a plurality of passages through the screen having axes substantially parallel to the surface of the screen.

In testimony whereof I affix my signature.

FRED HARRIS LYNDS.